United States Patent [19]

Boudreau et al.

[11] Patent Number: 5,011,247
[45] Date of Patent: Apr. 30, 1991

[54] UPTAPERED SINGLE-MODE OPTICAL FIBER PACKAGE FOR OPTOLECTRONIC COMPONENTS

[75] Inventors: Robert A. Boudreau, Hampton, N.H.; William C. Rideout, Townsend, Mass.

[73] Assignee: GTE Laboratories Incorporated, Waltham, Mass.

[21] Appl. No.: 487,497

[22] Filed: Mar. 2, 1990

[51] Int. Cl.$^5$ .............................................. G02B 6/42
[52] U.S. Cl. .................................. 350/96.2; 350/96.18
[58] Field of Search ................. 350/96.15, 96.18, 96.2; 357/74, 17, 19, 80, 81

[56] References Cited

U.S. PATENT DOCUMENTS

| | | | |
|---|---|---|---|
| 4,237,474 | 12/1980 | Ladany | 350/96.2 |
| 4,327,963 | 5/1982 | Khoe et al. | 350/96.18 |
| 4,737,004 | 4/1988 | Amitay et al. | 350/96.15 |
| 4,767,171 | 8/1988 | Keil et al. | 350/96.18 |
| 4,834,491 | 5/1989 | Aoki et al. | 350/96.2 |

FOREIGN PATENT DOCUMENTS 63-65411  3/1988 Japan .................................. 350/96.18

*Primary Examiner*—John D. Lee
*Assistant Examiner*—John Ngo
*Attorney, Agent, or Firm*—Victor F. Lohmann, III; James J. Cannon, Jr.

[57] ABSTRACT

A package for an optoelectronic device, such as a laser, having a photo-active element optically coupled to an uptapered single-mode optical fiber which connects said optoelectronic array to an external device includes a housing having a solderable substrate to which the device is secured, a graded index lens also secured to said substrate at a distance calculated to provide a known magnification of light beam emanating from said laser and an uptapered single-mode optical fiber mechanically positioned and actively aligned to said mangified light beam to achieve optimal optical coupling to said optoelectronic device. The package includes a plurality of reference marks and surfaces such that the laser, the lens and the uptapered end of a single-mode optical fiber may be positioned for precise optical coupling using an active alignment for final adjustments. The reference surfaces include a pedestal for the laser and a plurality of stops for the lens integrally formed with the substrate. The package also includes a fiber tube and flange for mechanically positioning the uptapered fiber. The precisely calculated spacing based on the spacing of said photo-active element, the magnification of said lens, and the fiber positioning is achieved by mechanical means.

26 Claims, 4 Drawing Sheets

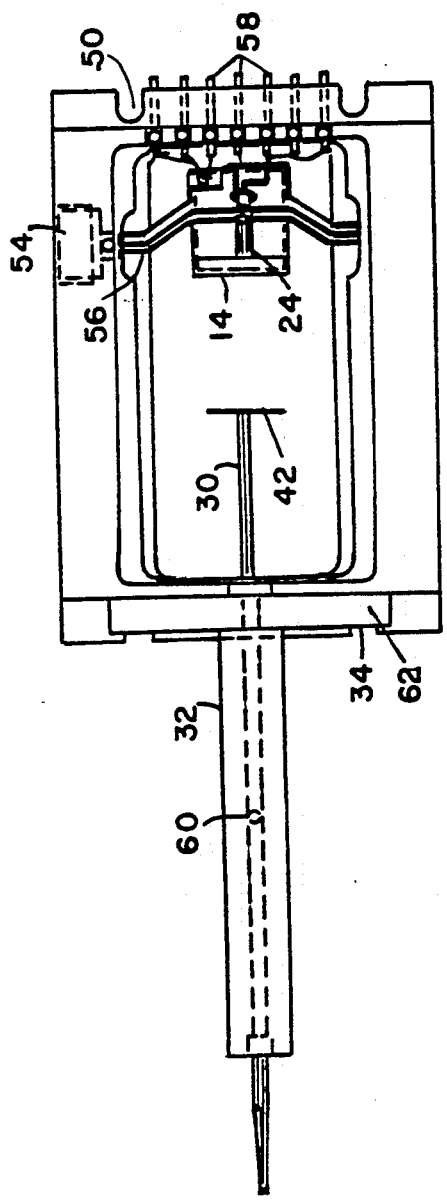
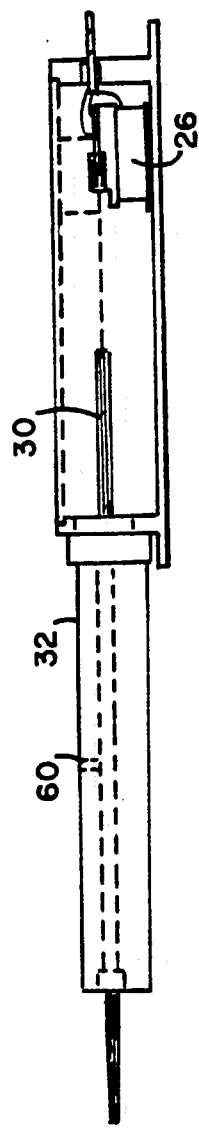
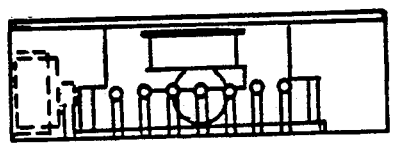

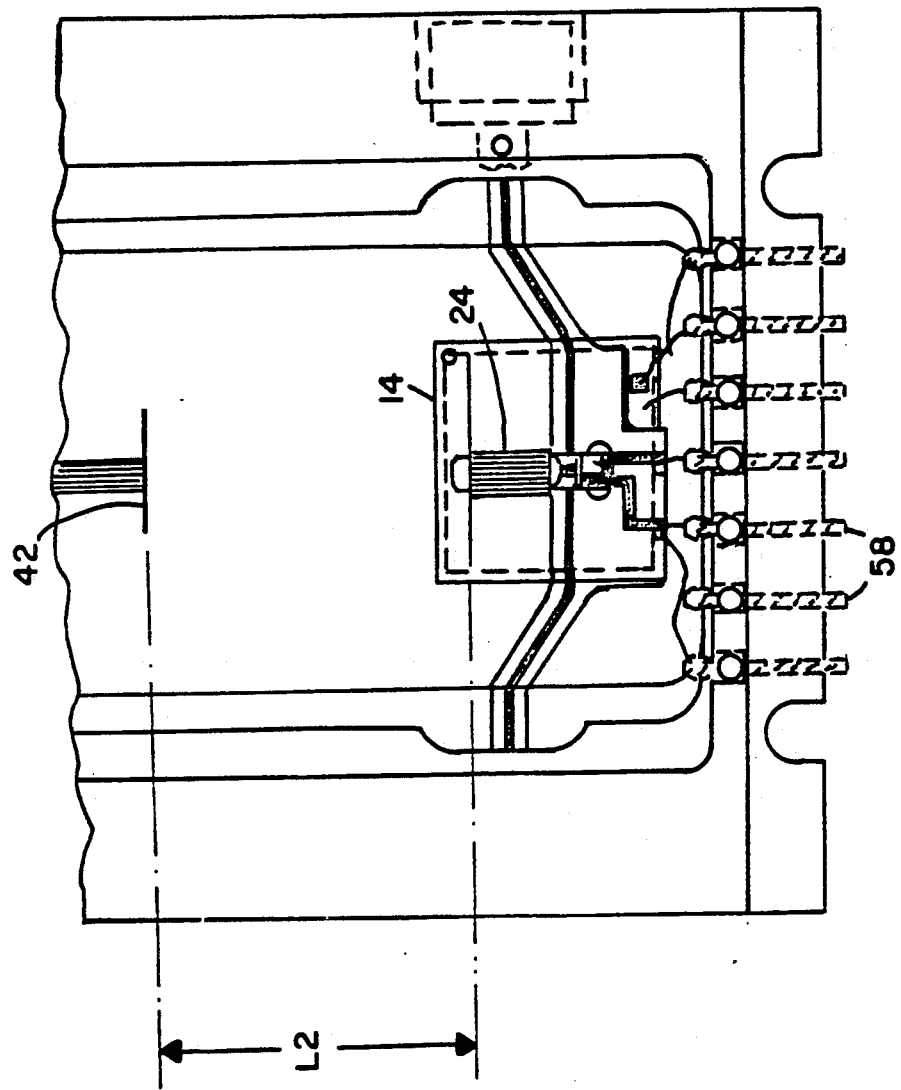

UPTAPERED SINGLE-MODE OPTICAL FIBER PACKAGE FOR OPTOELECTRONIC COMPONENTS

BACKGROUND OF THE INVENTION

This invention relates to packaging of optoelectronic components which generate or process signals that pass through optical fibers. In particular, it addresses the critical need for providing stable, low-cost alignment of single-mode optical fibers to a single packaged device, such as a semiconductor laser.

An optoelectronic package is a container or housing that provides protection and support for both active and passive components contained within it. These components and their interconnection represent an optical-electrical circuit and define the function of the package. The package also includes a means of connecting the internal components with the external environment, usually as electrical feed-through and optical fiber. Our invention is concerned with the optical fiber and how it is connected to the components within the package.

To make an optical connection between an optical fiber and an optoelectronic component within a package, it is necessary to position or align the optical fiber in a way that allows efficient coupling between the optical fiber and the optoelectronic component. The precision needed for the alignment depends on the size of the light-emitting or light receiving elements, the type of optical fiber, and any type of focusing or defocusing elements which may be present. Optical fiber transmits light through its inner core, which is much smaller than the diameter of the optical fiber. There are two classes of optical fiber presently used in packaging semiconductor devices: single-mode and multi-mode, with typical core diameters of about 10 microns and 50 microns, respectively. Many telecommunication applications use single-mode optical fiber because of the superior bandwidth arising from its reduction of mode partition noise.

The prior art for packaging semiconductor lasers is predominantly concerned with the easy task of aligning large cored multi-mode optical fiber. Multi-mode optical fiber is of little value for telecommunications because it suffers from mode-partition noise when used for high speed transmissions over a distance.

Laser packaging with single-mode optical fiber has been done with optical fibers which have their ends either cleaved or tapered and lensed. A cleaved optical fiber has an optically flat end, while a tapered and lensed optical fiber is drawn down to a point in a fashion that aids light entering the fiber. Packages incorporating cleaved optical fibers require a separate lens, as does the package of this invention, while packages incorporating lensed optical fibers do not.

Packages utilizing cleaved or tapered and lensed optical fibers suffer from stability problems associated with lateral movement of the optical fiber with respect to the laser. For this reason, the alignment of the optical fiber with the laser for such packages is usually done with expensive piezo-crystal micromanipulators having submicron sensitivity. The optical fiber is fastened with expensive laser welding techniques or special solders.

As explained by Rideout, et al, "Improved LED and laser packaging using up-tapered single mode fibers," CLEO '89, Baltimore, Md., Apr. 25, 1989, the improved lateral tolerances arise from first magnifying the emitting spot image of the laser. The larger spot is then projected congruently onto the corresponding uptapered optical fiber. The lateral and angular sensitivities are:

$$\text{Lateral coupling} = \exp \frac{-x^2}{w_o^2}$$

$$\text{Angular decoupling} = \exp \frac{-\pi^2 w_o^2/\theta^2}{\lambda^2}$$

where the symbols mean:
$W_o$ = spot radius of the optical fiber;
$\lambda$ = wavelength
$\theta$ = angular misalignment
$x$ = lateral misalignment The equations show that the spot radius of the light beam in the optical fiber determines these sensitivities. Since the spot radius is in the denominator of the lateral decoupling expression above, the benefit of decreased lateral sensitivity occurs with increased spot size. Conversely, the angular sensitivity becomes more detrimental since the spot radius is in the numerator of the angular misalignment expression above.

When performing optical fiber alignments, the lateral alignment is more difficult to achieve than the angular alignment. Thus, the net effect of using a lens to magnify the spot radius of the light beam for coupling it to a larger diameter uptapered optical fiber is beneficial.

It is worth noting that even though the thick section of the uptapered optical fiber does not qualify as a single-mode optical fiber diameter, it is short enough in length that it maintains only the single-mode. Thus, it is possible to obtain the advantage of the ease of alignment of a thick multi-mode optical fiber, while not losing the data transmission advantage of a thin single-mode optical fiber.

SUMMARY OF THE INVENTION

The principle object of the present invention is to provide an optoelectronic component package in which a single-mode optical fiber is easily and efficiently optically coupled to an active semicondutor laser.

A second object of the present invention is to provide such a package for an optical connection that permits long distance, high speed transmissions of telecommunications data and information for the semicondutor element.

Still a further object of the present invention is to provide such a package having a predictable, reproducible location of the optical fibers for maximum coupling efficiency, allowing for assembly line mass production of packaged optoelectronic components, since manufacturing is simplified, thereby reducing the costs of such packages.

In one aspect of the invention, a package for an optoelectronic device having an active element optically coupled to a single-mode optical fiber connecting said optoelectronic device to an external device includes a housing to enclose the necessary components to convert electrical signals to optical signals. A substrate carrier within said housing has a solderable surface and a plurality of reference means for precise positioning of elements within said package. An optoelectronic semiconductor laser device having an active element is positioned with respect to one of said reference means and secured to said carrier substrate. A graded index lens, having a numerical aperature sufficient to access optically said active element and having a curvature on one end closest to said optoelectronic device, is positioned with reference to a second of said reference means and secured to said substrate a fixed distance from said optoelectronic active element to yield a desired magnification of light beams emanating from said active element. An uptapered single-mode optical fiber extends from a third one of said reference means within said housing to the exterior of said housing through a port thereof, said optical fibers being precisely positioned by a fiber tube flange secured to a side wall adjacent said port of said housing, the uptapered end of said optical fiber being mechanically aligned, with respect to the third of said reference means, for optical coupling through said lens to said photo-active spot of said optoelectronic device, while the opposite end of said single-mode optical fiber is outside said housing.

BRIEF DESCRIPTION OF THE DRAWINGS

FIGS. 2a, 2b and 2c are, respectively, top, side and end views of the preferred embodiment of an optoelectronic package, according to the invention;

FIG. 3 is a partially cut-away top view of the embodiment of an optoelectronic package of FIG. 2a, enlarged to show details of the package.

DESCRIPTION OF THE PREFERRED EMBODIMENTS

This invention pertains to packages for optoelectronic devices which provide stable alignment, using a mechanical method for quick and efficient optical coupling of an uptapered single-mode optical fiber to the photo-active spot of the semi-conductor element. The package controls the uptapered fiber optical tolerances, allowing a relaxation of the optical fiber positional tolerance.

The package of this invention uses a lens, with a sufficient numerical aperature and magnification, in conjunction with uptapered single-mode optical fiber. The alignment technique takes advantage of the relaxed mechanical tolerance and the magnification provided by the lens and the larger cored uptapered fiber optics. Such optical connections then permit independent transfer of telecommunications data and information for the semiconductor element.

Specifically, this invention provides a new package for optically coupling an uptapered single-mode optical fiber to a single packaged optoelectronic device using a single lens mechanically aligned with the semiconductor element in order to magnify the spot image of the photo-active element to expand the size of the emitted light beam. This image is then coupled to an uptapered optical fiber. This magnification greatly facilitates mechanical alignment and coupling of the semiconductor laser to the associated optical fiber by relaxing mechanical tolerances associated with the position of the ray of light coming from the laser.

Uptapered optical fibers are used because the effect of magnification increases the size of the beams or spot. These beams are best collected on the thick end of the uptapered fiber, where the size of the optical fiber best matches the size of the beams. For example, a typical uptapered optical fiber may have a core that is ten times larger on its thick end than the single-mode optical fiber that it tapers down to. This optical fiber is used with a lens that magnifies the spot size of the beam tenfold. This effect facilitates the alignment when assembling an optoelectronic package.

Mechanical alignment is also possible with these packages because the location of the semiconductor beam can be known with high precision relative to the package. This is because the semiconductor photoactive element is usually patterned on the semiconductor with photolithography to a high level of precision, about one micron, and the lens projects a precise image of this pattern towards the fiber. If a lens with known magnification is first positioned rigidly in a specified location, then the location of the projected beam is know. Alignment to this beam automatically aligns the uptapered optical fiber held in a fixture engineered with the geometry set by the known magnification determined by the lens.

Figure 1:
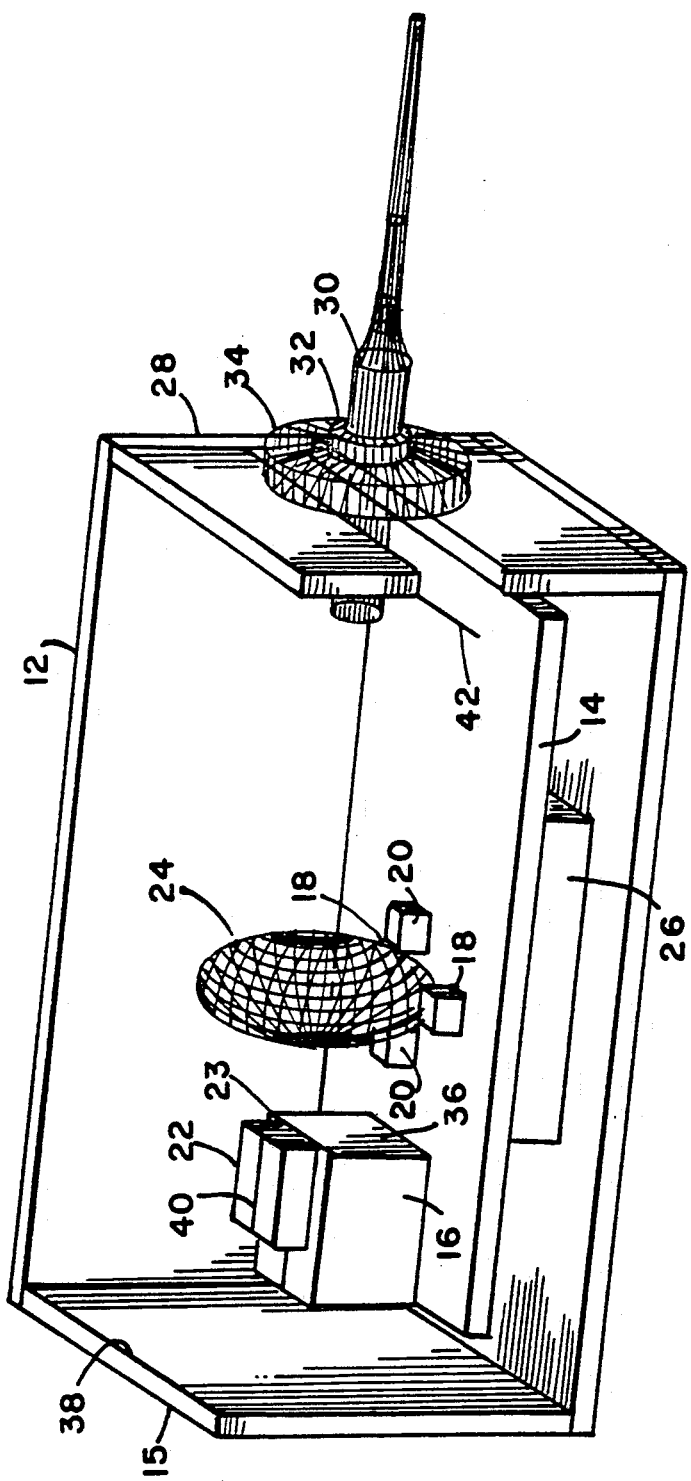
FIG. 1 is a schematic perspective view of a generalized embodiment of an optoelectronic package which illustrates a package according to the principles of the invention and the method of packaging an optoelectronic component according to the invention using reference marks to mechanically align an uptapered optical fiber to a semiconductor laser.

FIG. 1 illustrates a generalized package for an optoelectronic component and a method for assembling the package, according to this invention. Package 10, shown partially cutaway in FIG. 1, comprises a housing 12, which completely encloses the necessary components that convert input electrical signals to optical signals. Preferably, housing 12 is made of brass and has a removable top for access to the interior. A carrier 14 having a surface that is readily solderable, such as gold-plated copper or brass, is used to support the components. A pedestal 16 is secured to a first major surface of carrier 14 adjacent to a first end wall 15 of housing 12, for mounting and positioning a semiconductor laser 22 having a photo-active spot 23. Two lateral stops 18 and two axial stops 20 are also secured in a central location to the same major surface of carrier 14 for positioning a lens 24, which is hard soldered prior to the optical fiber alignment. Preferably carrier 14, pedestal 16 and stops 18, 20 are integrally formed as a one-piece element. A thermoelectric cooler 26 is secured to the second major surface of carrier 14. A second end wall 28 has a circular opening (not shown in FIG. 1) to permit the insertion of the thick end of uptapered optical fiber 30, which is enclosed in a fiber tube 32 and rigidly held perpendicular to end wall 28 by a large flange 34. The lens 24 focuses the light from the photoactive spot 23 of laser 22 onto uptapered optical fiber 30.

A plurality of mechanical features, and registration features and/or reference marks are incorporated into housing 12 and carrier 14 so that the total package 10 mechanically controls the uptapered-fiber optical tolerances, thus allowing a relaxation of the uptapered optical fiber positional tolerance. The uptapered-fiber optical tolerances controlled by package 10 are, the semiconductor position, the lens-to-semiconductor distance; the stability of lens attachment; and the tight angular control of the uptapered fiber.

A one-piece carrier 14 holds the laser 22 and the lens 24. This controls the stability of the lens-to-semiconductor positional tolerance. Semiconductor 22 and lens 24 move in unison, despite shifts in other package parts caused by vibrations or thermal variations. The lens 24 is hard soldered prior to doing the optical fiber alignment to provide mechanical stability. For this optical element, lens 24, stability is more important than exact positioning. Some misalignment of the lens 24 can be compensated for during alignment of the uptapered optical fiber 30.

The height of pedestal 16 controls the height of laser 22 (y-axis). The forward edge 36 of pedestal 16 serves as the forward reference mark for laser 22 (z-axis). A lateral reference mark 38 on pedestal 16 is aligned with an active region reference mark 40 on laser 22 (x-axis) to control the lateral position of laser 22. Axial stops 20 control the lens-to-semiconductor distance, while lateral stops 18 control the horizontal alignment of the lens 24 to the photo-active spot 23 of laser 22. The relative positioning of the laser 22 and the lens 24 is usually set to a positional accuracy of about one-half mil. This can be done off-line under a stereomicroscope, making use of the reference marks 36, 38, 40.

The position of the lens 24 sets the magnification of the light-emitting area (photo-active spot 23) of laser 22. The magnification is set to best match the projected emitting area size with the core of the uptapered optical fiber 30. The proper magnification position is set by the axial and lateral stops 18, 20, which are registration features on the carrier 14.

The uptapered optical fiber 30, protected by a fiber tube holder 32, is mounted and aligned externally to the package 10. The uptapered end of optical fiber 30 extends inside the package to a fiber tip reference mark 42 on carrier 14, which is a known distance from axial lens stops 20. The package cover (not shown in the figures) is in place, so that the interior of the package is protected from damage. After fiber positioning, using reference marks 42, 20 the uptapered optical fiber 30 is actively aligned, requiring only crude low cost micrometers and is secured in position with simple means such as epoxy or screws (not shown in FIG. 1). Active alignment means the fiber is aligned to maximize the light beam entering the fiber while the laser is operating. The uptapered optical fiber 30 and the fiber tube holder 32 are easily removed and replaced for packages that have suffered fiber damage, because interior parts need not be disturbed. The uptapered optical fiber is held perpendicular to the package by a large fiber flange 34 on the fiber tube holder 32. This controls the angular uptapered optical fiber optical tolerance. It also improves stability because an uptapered optical fiber is more sensitive to angular misalignment than a conventional tapered and lensed or cleaved fiber.

A long focal distance between the lens 24 and the uptapered end of optical fiber 30 allows space to introduce optical elements such as filters and opto-isolators. In this space the light beam is nearly collimated, greatly simplifying the optical designs incorporating these elements.

The carrier 14 supporting the lens 24 and semiconductor 22 could be part of a circuit board, multi-chip module, or semiconductor waferboard carrying other optical and electronic components.

The lens 24 could be either a GRIN type, convex, plano-convex, or combination of several lenses. The only requirement is that it provide the necessary magnification to match light spot sizes with the uptapered end of optical fiber 30.

Internal optical elements, such as opto-isolators or filters, can be located in the space between the lens 24 and the fiber 30 in any combination. Optical coatings could also be placed on the lens 24 to provide some of the function of these optical elements.

The registration or reference marks 18, 20, 36, 38, 42 on the carrier can be either mechanical stops, slots, pins, visual lines, steps or the like. The only requirement is that they be part of the carrier 14 and provide half mil or better accuracy for the lens 24 and the semiconductor 22 positions.

FIG. 1 shows the uptapered-fiber laser package with the lid removed so that the components are visible. This package incorporates an externally aligned uptapered fiber 30, which is aligned and epoxied onto the outside of the package housing 12 at room temperature. This is the only active alignment, and can be performed without piezoelectric staging because of the relaxed lateral alignment tolerances. An AR-coated GRIN lens images the laser spot onto the uptapered fiber. This lens is soldered in place with high temperature solder for maximum stability.

FIGS. 2a, 2b, 2c, 3 and 4 illustrate details of the preferred embodiment of the uptapered single-mode optical fiber package according to the invention, as built and tested by the inventors. In these figures, the same reference numbers are used for corresponding parts as were used in FIG. 1. Some elements not part of the invention are shown in the figures and mentioned in the specification without further elaboration.

FIGS. 2a, 2b and 2c are top, side and end views of the preferred embodiment of package 10, illustrating its assembly. The following items are specific to this embodiment. A graduated index (GRIN) lens is used for lens 24. A thermo-electric temperature control (TEC) 26 is present. This package is designed for epi-down semiconductor mounting. The carrier 14 does not extend the full length of the housing 12, so the fiber tip reference mark 42 is on the base of the housing. A precision fiber tube 32 having an epoxy fill tube 60 for securing the optical fiber 30 after alignment holds the uptapered end of the optical fiber. Fiber tube flange 34 surrounding fiber tube 32 is fastened with epoxy to the outside of the at epoxy joint 62 to complete the alignment.

A screw mounting slot 50 is present. An SMA connector socket 54, a high frequency microline 56 connected thereto, and seven d.c. in-line pin outs to provide high speed electrical signals complete the package. The package housing 12, the fiber tube 32, and the cover (not shown) are preferably, made of brass. Carrier 14 is preferably made of nickel and gold-plated copper. Package 10 in this embodiment is a high speed laser package having the uptapered fiber optical tolerance controls built into the package.

The lasers used in this package are 1.3 $\mu$m Vapor-Phase-Regrowth Burled Heterostructure (VPR-BH) lasers which have a demonstrated maximum bandwidth of 22 GHz and typical bandwidths of 15 GHz. Previously developed microstrip techniques are used to preserve the high frequency integrity of the package to 25 GHz.[5] Measurements of the variation in output power with slight changes in axial position of the uptapered indicate that back reflections which might introduce noise are less than −45 dB.

Excellent packaged coupling efficiencies of approximately 30% are obtained, which compare favorably to the maximum of 35% obtained on the laboratory bench, and 22% which are obtained using standard tapered-and-lensed fibers with a 12 $\mu$m radius tip and a 30° included angle.

The lens 24 used is a SELFOC GRIN lens (model PCH 1.8-0.22). The uptapered fiber 30 used was made at GTE Laboratories Incorporated. It has an uptapered core size of 90μ and a single mode fiber core size 9μ. The fiber has a cut and polished tip to reduce light scattering loss.

The features of the package that control the uptapered-fiber optical tolerances are shown in Table I. Based on measurements of the package, the mechanical optical tolerances are shown in Table I. The use of a one piece carrier 14 eliminates tolerance "stack-up" arising if separate pedestal, lateral, and axial stops were bonded to the carrier.

TABLE I

| Package Optical Control Tolerances | |
|---|---|
| Control Point | Tolerance |
| fiber tip reference | 5.0 mils |
| fiber tube flange | 0.5° of arc |
| axial stops | 0.5 mils |
| lateral stops | 0.5 mils |
| pedestal height | 0.5 mils |
| active region reference | 0.1 mils* |
| lateral reference | 0.5 mils |
| forward reference mark | 0.5 mils |

*this item is normally defined with photolithography

This embodiment uses epi-down lasers. This eliminates the positional tolerance associated with the thickness of the wafer because the light emitting area is essentially at the pedestal/semiconductor interface. A reference mark 40 on the laser 22 enables its correct positioning on the pedestal 16 during assembly since the active region 23 in the semiconductor 22 is on the reverse side and not visible.

The GRIN lens 24 straddles a slot that determines its height above the carrier and its lateral position. The back edge of the lens registers with a raised edge on the carrier 14 that defines the axial stop 20.

Table I compares observed tolerances for the uptapered fiber package with those of a typical lensed-and-tapered fiber package. These tolerances represent the measured misalignment which reduces the coupled power by about 25%.[2] The most important implications of this table for package design are: (1) the relaxed tolerance in the uptapered fiber position (lateral and transverse) is responsible for the increased yield, stability, and ease of assembly, (2) Critical tolerances (angular alignment and magnification) are met by built-in alignment marks and stops in the one-piece carrier, fiber flange, and housing, as schematically shown in FIG. 1. The fiber flange was designed to automatically align the uptapered fiber parallel to the beam within 0.5°.

TABLE I

| Tolerances for Components Within Package | | |
|---|---|---|
| Approximate Tolerances | Uptapered Fiber Package | Tapered and Lensed Fiber Package |
| Fiber position: | | |
| axial (parallel to fiber) | 125 μm* | 4 μm |
| lateral (∥ to laser) | 25 μm | 0.5 μm |
| transverse (⊥ to laser) | 25 μm | 0.5 μm |
| Fiber angle | 0.5° | 12° |
| GRIN lens | 13 μm | Not Applicable |
| Semiconductor laser | 13 μm | Not Applicable |

*component held to within tolerance by self-alignment to package hardware.

Figure 4:
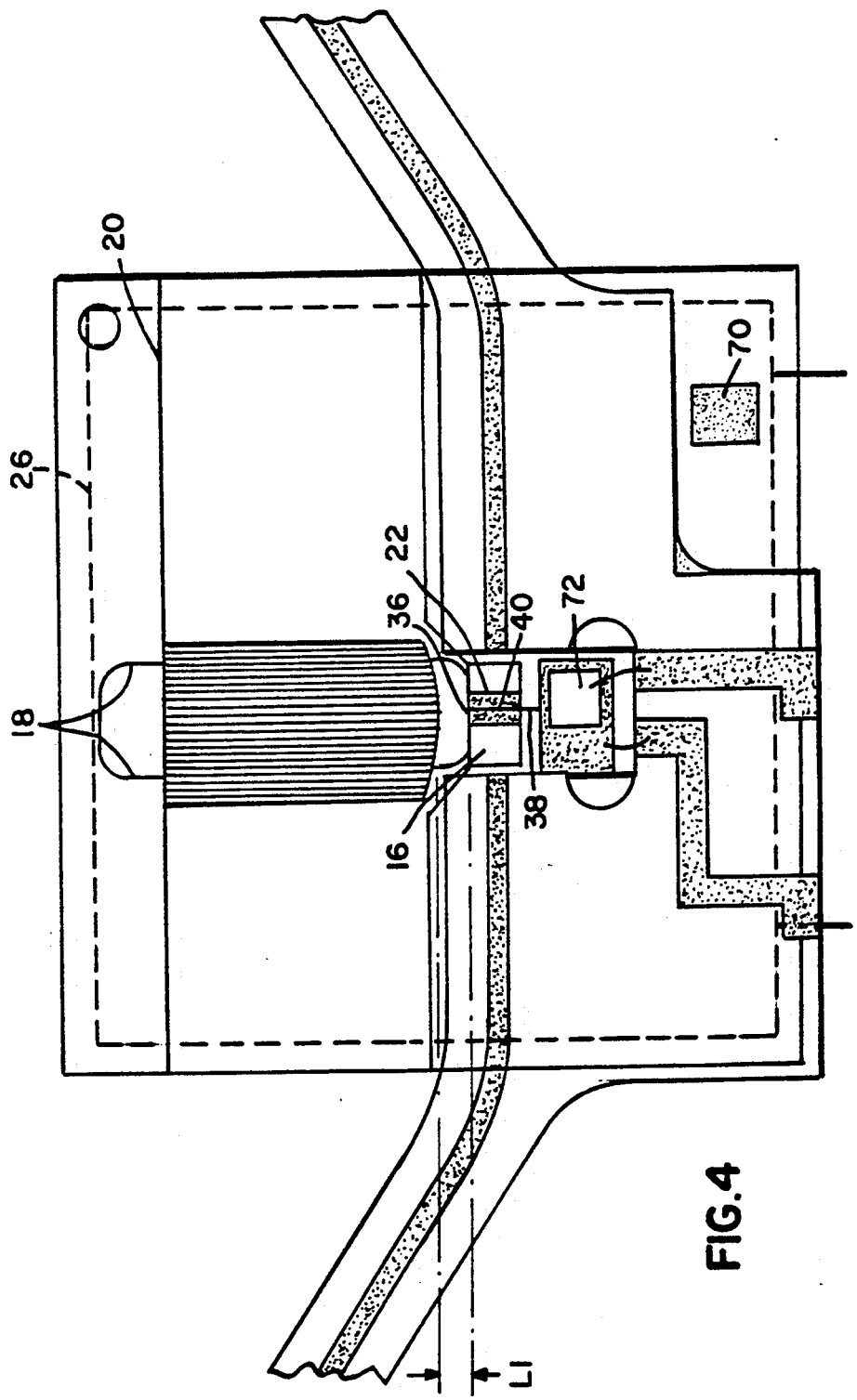
FIG. 4 is a top view of the embodiment of FIG. 2a, further enlarged to show details of substrate carrier.

FIGS. 3 and 4 are enlarged top views of the embodiment of FIG. 2a, showing further details of the package features which mechanically control the fiber optic tolerances. Referring now to these figures, two optical path distances, L1 (FIG. 4) and L2, (FIG. 3) should be maintained to achieve the correct magnification in the package 10. L1 is the distance between laser 22 and lens 24 while L2 is the distance between lens 24 and uptapered-fiber 50. Distance L1 was 15.5 mils. A magnification of 10 was used to optically match the semiconductor spot size 23 with the uptapered core. Distance L1 can be checked with a low power (30×) stereomicroscope. Distance L2 is controlled by setting the fiber tip at the fiber tip reference mark. L2 is 0.475 inches.

For stability, the GRIN lens 24 is soldered to the carrier 16 with a reasonably hard 52/48 In/Sn 118° C. solder. The solder should be reflowed, and the lens position adjusted along its slot if L1 is found incorrect when checked.

Following active alignment, a bead of epoxy is applied to both the fiber tube flange 34 and the tube 32 epoxy fill hole 60. Our package allows its cover to be in place during the alignment.

The fiber tube flange 34 controls the fiber angle at 90°. The package normally does not require angular alignment. Only translational alignment is needed.

Our uptapered fiber 30 requires an angular alignment of one half degree of arc. If the tolerances listed in Table I are maintained, and the L1 position is checked and adjusted properly, the package will achieve this.

If these tolerances are not strictly held, good alignments are still possible, but the active alignment process must include angular alignment of the fiber 30 rather than just lateral alignment. This is done by varying the angle of the fiber tube 32 slightly about the horizontal and vertical axes. Epoxy may still be used to join 62 the flange to the package.

The completed package offers both temperature and optical power monitoring of the semiconductor 22. Temperature regulation is provided by the thermoelectric cooler 26 as controlled by the thermistor 30. Optical power monitoring is provided by the rear facet detector 72 that measures the lost light emitting from the rear of the laser 22.

High frequency capability is provided by several features. A 50 ohm impedance microstrip line transmits the high speed signal between the laser and an SMA microwave connector 54. A short wirebond between the semiconductor 22 and microstrip 56 minimizes parasitic capacitances and inductances. In FIG. 2a, the microstrip line 56 opposite the SMA connector 54 provides for only mechanical positioning and serves no electrical function.

A second embodiment (not shown) is the same as the first embodiment except that the semiconductor laser 22 is mounted epi-up. This means that the light emitting region 23 is now near the top surface of the semiconductor die. The pedestal height 17 must be reduced to offset the thickness of the semiconductor 22 and bring the light-emitting spot 23 back to the axis of the lens 24.

This embodiment offers two advantages over the first embodiment:

The active region 23 features in the semiconductor are directly visible, allowing more precise alignment to the lateral reference mark 38 on the pedestal 16.

It allows for epi-up bonding of semiconductor material reducing diebonding yield loss present with some diebonding solders and laser structures.

The comparative disadvantage of this design is that the wafer thickness now becomes a controlling optical tolerance requiring an additional wafer thinning processing step or alternatively a set of calibrated carriers with different known pedestal heights.

It is possible to vary the design of package 10 while preserving elements of our invention. Variations could be both internal or external to the package housing. The material comprising the package housing 12 may be metal, ceramic or plastic.

EXTERNAL VARIATIONS

The diameter of the uptapered-fiber 30 may be increased requiring a greater magnification from the lens 24. The greater magnification is achieved by using a different lens or lens position. This variation, of increasing the magnification, results in further reduction of the lateral positional tolerance.

The length of the thick section of the uptapered-fiber 30 may be altered. A shorter length section would make a more compact package.

The fiber 30 may be held by a variety of different shaped holders but it always needs to be held rigidly. It is likely that it would always require some kind of flange type attachment 34 such as the one in FIG. 1 to maintain stability.

Some commercial fibers are supplied with flange shaped connectors on the end and it is likely that uptapers will be supplied this way once the uptapers become commercially available. If this happens, the uptapered package may be designed to accommodate the commercial flange rather than have a special package flange.

The mode of fastening the fiber may be varied. Different types of epoxies, polyesters, solders or welds may be used. In some circumstances it may be possible to screw, crimp, or even use an amalgam to attach the fiber holder to the package.

INTERNAL VARIATION

The package is made more compact by using stronger, shorter focal length lenses. In this case, the end of the uptapered-fiber is placed closer to the lens.

In conclusion, we have realized the first laser package to incorporate an uptapered fiber pigtail. Because of the relaxed alignment tolerances afforded by the uptapered, external alignment and attachment of the fiber can be implemented. The result is an easy-to-assemble, rugged package that is suitable for all local loop applications, and readily lends itself to automated packaging techniques.

What is claimed is:

1. A package for an optoelectronic semiconductor device having a photo-active element optically coupled to an uptapered single-mode optical fiber connecting said optoelectronic device to an external device, comprising:
   a housing to enclose the necessary components to convert electrical signals to optical signals;
   a substrate carrier having a solderable surface within said housing; an optoelectronic device having an photo-active element secured to said subcarrier;
   a lens, having a numerical aperture sufficient to access optically said photo-active element secured to said carrier a fixed distance from said photo-active element to yield a desired magnification of a light beam emanating from said photo-active element by expanding the size of said beam;
   an uptapered single-mode optical fiber extending from within said housing to the exterior of said housing through a port thereof, said optical fiber being positioned by active alignment;
   means to secure said uptapered optical fiber to said housing such that the uptapered end of said optical fiber is optically coupled through said lens to said photo-active element and the opposite end of said optical fiber is outside said housing; and
   a plurality of reference means on said housing and said carrier such that said optoelectronic device, said lens and said optical fiber are mechanically positioned with respect to one or more of said reference means; and such that uptapered said optical fiber is externally aligned and secured to said package.

2. The package of claim 1 wherein:
   said substrate carrier includes a pedestal integrally formed with said substrate;
   said optoelectronic device is mounted on said pedestal; and
   said reference means include the upper surface and one side surface of said pedestal, and a reference mark on said upper surface for alignment with a reference mark on said optoelectronic device.

3. The package of claim 1 wherein said reference means for mechanically positioning said lens on said carrier comprises:
   a pair of spaced apart lateral stops integrally formed with said carrier; and
   a pair of spaced apart axial stops integrally formed with said carrier;
   such that said lens is rigidly positioned between each pair of stops in alignment with said photo-active spot and said uptapered optical fiber.

4. The package of claim 1 wherein said lens is a graded index lens and is secured to said carrier with a moderate melting point solder.

5. The package of claim 1, further comprising:
   a thermoelectric cooler positioned under said substrate carrier within said housing to maintain a stabilized temperature for said optoelectronic device.

6. An uptapered single-mode optical fiber package providing mechanically precise, stable alignment of an uptapered optical fiber with a semiconductor laser having a photo-active element within said package, comprising:
   a housing to enclose the necessary components to convert electrical signals to optical signals;
   a substrate carrier having a solderable surface within said housing;
   a plurality of reference means positioned on said housing and said substrate carrier;
   an optoelectronic laser device having a photo-active element and having a reference means, secured to said substrate carrier in alignment with a first set of corresponding reference means;
   a graded index lens, having a numerical aperture sufficient to access optically said photo-active element aligned with a second set of reference means and secured to said substrate a fixed distance from said photo-active element to yield a desired magnification of a light beam emanating from said photo-active element;
   an uptapered single-mode optical fiber extending from within said housing to the exterior of said housing through a port thereof for connection of said laser to a device external to said housing;
   fiber positioning means to mechanically align said uptapered optical fiber with respect to a third set of reference means and to support said uptapered optical fiber in said aligned position, said optical fiber being positioned by active alignment and secured to said fiber positioning means such that the uptapered end of said optical fiber is optically coupled through said lens to said photo-active element of said laser and the opposite end of said optical fiber is outside said housing, and such that the distance between said uptapered end of said optical fiber and said lens and the distance between said lens and said active element is prespecified by said reference means; and said fiber positioning means being secured to said package with said optical fiber in said aligned position.

7. The package of claim 6 wherein:
said substrate carrier includes a pedestal integrally formed with said substrate;
said optoelectronic device is mounted on said pedestal; and
said reference means include the upper surface and one side surface of said pedestal, and a reference mark on said upper surface for alignment with a reference mark on said optoelectronic device.

8. The package of claim 6 wherein said reference means for mechanically positioning said lens on said carrier comprises:
a pair of spaced apart lateral stops integrally formed with said carrier; and
a pair of spaced apart axial stops integrally formed with said carrier;
such that said lens is rigidly positioned between each pair of stops in alignment with said photo-active spot and said uptapered optical fiber.

9. The package of claim 6 wherein said graded index lens is secured to said substrate with a moderate melting point solder.

10. The package of claim 6, further comprising:
a thermoelectric cooler positioned under said substrate carrier within said housing to maintain a stabilized temperature for said semiconductor laser device.

11. The package of claim 6 wherein said reference means for mechanically positioning said uptapered optical fiber further comprise:
a reference mark within said housing to position the uptapered end of said optical fiber; and
a reference surface on the side wall of said housing through which said fiber passes.

12. The package of claim 11 further comprising:
a support means for said uptapered optical fiber, said support means being positioned at the port of said housing through which said optical fiber extends.

13. The package of claim 12 support wherein said support means for said uptapered optical fiber comprises:
a fiber tube adapted to receive an uptapered optical fiber in a fiber-receiving position which is determined by the active element-to-lens spacing, such that said uptapered optical fiber may be optically coupled to active element of said semiconductor laser through said lens;
said optical fiber in said fiber tube being actively aligned with said photo-active element and secured in said aligned position; and
a fiber tube flange to secure said fiber tube to said housing with said fiber in alignment with said semiconductor and with said third set of reference means.

14. An improved package providing for the precise, secure alignment of an uptapered single-mode optical fiber to a single packaged optoelectronic laser device having a light-emitting source, said package including:
a housing to enclose the necessary components to convert electrical signals to optical signals;
a substrate carrier having a solderable surface within said housing;
an optoelectronic laser device having a light-emitting source positioned on and secured to said substrate;
a graded index lens having a numerical aperture sufficiently large to optically access the light-emitting sources of said optoelectronic array; wherein the improvement comprises:
a plurality of reference means located on said housing and said substrate;
a portion of said substrate being adapted to receive said laser and said lens;
said optoelectronic laser device being positioned mechanically with respect to a first set of reference means;
said graded index lens being mechanically positioned with reference to a second set of reference means and secured to said substrate of a fixed distance from said laser such that the light beams from said light-emitting source are magnified and the spacing between said beams is expanded;
said uptapered optical fiber being mechanically positioned with respect to a third set of reference means and actively aligned with said light-emitting source by optically coupling the thick end of said uptapered single-mode optical fiber to a light beam emanating from said laser after said beam has been magnified by said lens; and
said means to secure said uptapered optical fiber to said package after alignment.

15. The package of claim 14 wherein said reference means for mechanically positioning said uptapered optical fiber further comprise:
a reference mark within said housing to position the uptapered end of said optical fiber; and
a reference surface on the side wall of said housing through which said fiber passes.

16. The package of claim 15 wherein said means to secure said uptapered optical fiber to said housing comprises:
support means for said uptapered optical fiber, said support being positioned and secured at the port of said housing through which said uptapered optical fiber extends.

17. The package of claim 16 wherein said support means further comprises:
a fiber tube adapted to receive an uptapered optical fiber in a fiber-receiving position which is determined by the photo-active element-to-lens spacing, such that said uptapered optical fiber may be optically coupled to said photo-active element through said lens;
said uptapered optical fiber in said fiber tube being positioned with respect to said reference means, actively aligned with said photo-active element, and secured in an aligned position within said fiber tube;
means to secure said fiber tube to said housing with said fiber in its aligned position.

18. The improved package of claim 14 wherein said alignment further comprises:

a fiber tube adapted to receive said uptapered optical fiber and to position said fiber with reference to said third set of reference means;

said graded index lens having a predetermined magnification factor being positioned and rigidly secured such that a beam between said optoelectronic laser and said optical fiber passes through the center of said lens;

the position of said lens being determined by the precise location of said light-emitting source as determined by said first set of reference means and the precise location of said second set of reference means such that said activated light-emitting sources as magnified by said graded index lens are coupled to said uptapered fiber; and said uptapered optical fiber being secured to said package such that said optical fiber is positioned to be coupled with a beam of known location and size emanating from said activated light-emitting source.

19. The improved package of claim 18 wherein said optical fiber tube is secured in said aligned position to said housing by a fiber tube flange.

20. The improved package of claim 18 wherein said graded index lens is secured to said substrate with a moderate melting point solder.

21. The improved package of claim 18 wherein said optical fibers are secured in said fiber tube by a room temperature curing epoxy.

22. The improved package of claim 18 further comprising:

a fiber tube flange adapted to receive an uptapered optical fiber in said a fiber-receiving tube in a position which is determined by the laser-to-lens spacing, such that said uptapered optical fiber may be optically coupled to a correspondingly positioned light-emitting source through said lens;

said uptapered optical fiber in said fiber tube holder being actively aligned with said light-emitting source by the alignment of its optical fiber tube with the corresponding light-emitting source; and said fiber tube holder being secured in its aligned position with epoxy.

23. The improved package of claim 14 further comprising:

a thermoelectric cooler positioned under said substrate carrier within said housing to maintain a stabilized temperature for said optoelectronic laser device.

24. The improved package of claim 14 wherein:

said substrate carrier includes a pedestal integrally formed with said substrate;

said optoelectronic device is mounted on said pedestal; and said reference means include the upper surface and one side surface of said pedestal, and a reference mark on said upper surface for alignment with a reference mark on said optoelectronic device.

25. The improved package of claim 14 wherein said reference means for mechanically positioning said lens on said carrier comprises:

a pair of spaced apart lateral stops integrally formed with said carrier; and a pair of spaced apart axial stops integrally formed with said carrier;

such that said lens is rigidly positioned between each pair of stops in alignment with said photo-active spot and said uptapered optical fiber.

26. The improved package of claim 14 wherein said reference means for mechanically positioning said uptapered optical fiber further comprise:

a reference mark within said housing to position the uptapered end of said optical fiber; and a reference surface on the side wall of said housing through which said fiber passes.

* * * * *